(No Model.) 3 Sheets—Sheet 1.
J. H. PENDLETON & C. TIERS.
MECHANISM FOR ACTUATING THE CLUTCH AND BRAKE IN CABLE RAILWAYS.
No. 351,124. Patented Oct. 19, 1886.
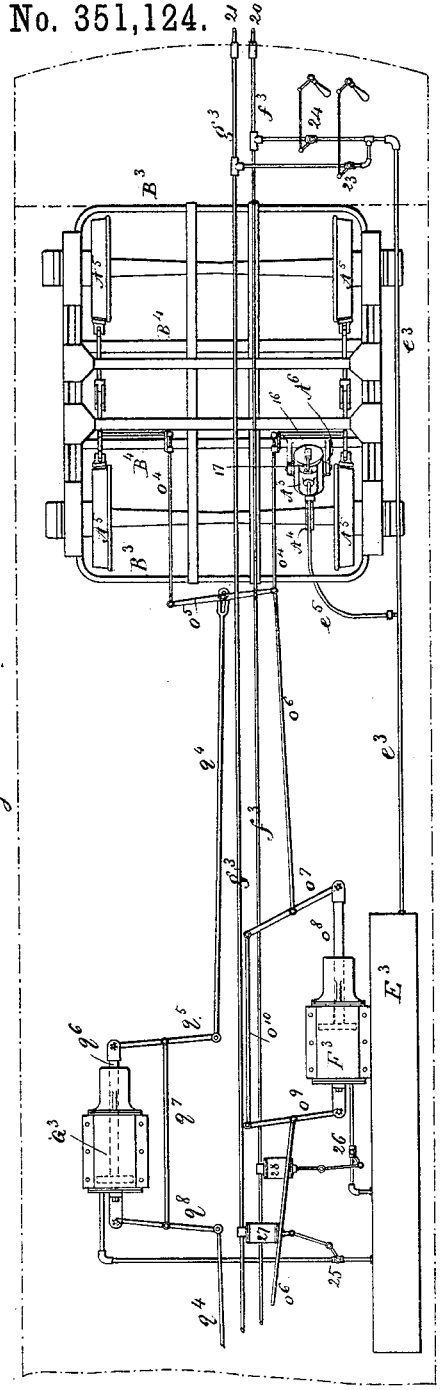
Witnesses:
J. Staib
Chas. H. Smith
Inventors
John H. Pendleton
Cornelius Tiers
per Lemuel W. Serrell
atty.

(No Model.) 3 Sheets—Sheet 2.

J. H. PENDLETON & C. TIERS.
MECHANISM FOR ACTUATING THE CLUTCH AND BRAKE IN CABLE RAILWAYS.

No. 351,124. Patented Oct. 19, 1886.

Witnesses:
J. Staib
Chas H Smith

Inventors:
John H. Pendleton
Cornelius Tiers
per Lemuel W. Serrell atty (No Model.) 3 Sheets—Sheet 3.
J. H. PENDLETON & C. TIERS.
MECHANISM FOR ACTUATING THE CLUTCH AND BRAKE IN CABLE RAILWAYS.
No. 351,124. Patented Oct. 19, 1886.
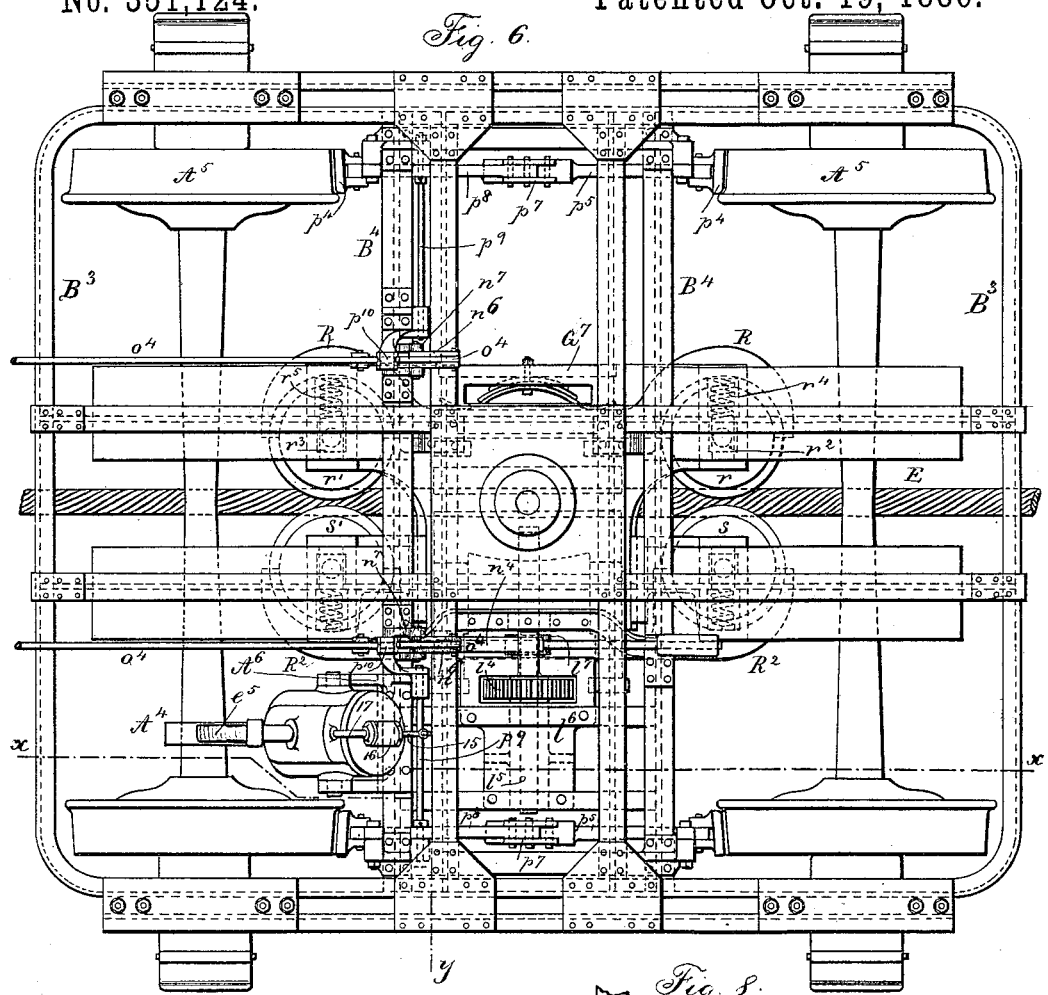
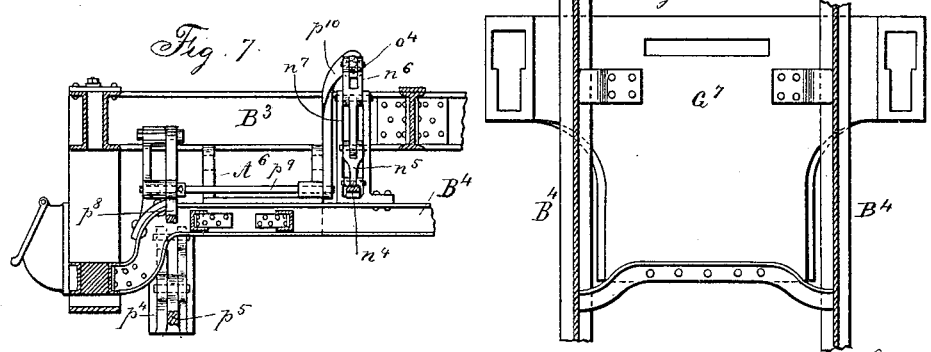
Witnesses:
I. Staib
Chas. H. Smith
Inventors
John H. Pendleton
Cornelius Tiers
per Lemuel W. Serrell
Atty

UNITED STATES PATENT OFFICE.

JOHN H. PENDLETON, OF BROOKLYN, AND CORNELIUS TIERS, OF NEW YORK, N. Y., ASSIGNORS, BY DIRECT AND MESNE ASSIGNMENTS, TO THEMSELVES, ALEXANDER H. TIERS, ROBERT I. SLOAN, AND LINCOLN MOSS, ALL OF NEW YORK, N. Y., AND THOMAS NAST, OF MORRISTOWN, NEW JERSEY.

MECHANISM FOR ACTUATING THE CLUTCH AND BRAKE IN CABLE RAILWAYS.

SPECIFICATION forming part of Letters Patent No. 351,124, dated October 19, 1886.

Application filed August 6, 1885. Serial No. 173,680. (No model.)

*To all whom it may concern:*

Be it known that we, JOHN H. PENDLETON, of Brooklyn, in the county of Kings and State of New York, and CORNELIUS TIERS, of the city, county, and State of New York, have invented an Improvement in Actuating the Clutch and Brake in Cable Railways, of which the following is a specification.

This improvement is especially available for cars running on surface or elevated railways, and propelled by a cable.

In our improvement the cable passes between guiding-wheels and through a grip by which the cable is either connected to the car or allowed to continue to travel while the car is stopped.

We make use of a reservoir into which atmospheric air is pumped, and when the maximum pressure has been obtained the pump is automatically stopped. When the car or train is to be connected with the cable, air is admitted from the reservoir into a cylinder, and acts upon a piston that applies the gripping device to the cable, and the grasping is gradual, so as not to start the car suddenly, the brake of the car being relieved automatically before the clutch comes into action. When the car is to be stopped, air is admitted from the reservoir to act upon a piston in the second cylinder and release the hold of the grip upon the cable and then apply the brakes to the wheels, and we arrange the connections in such a manner that one person upon either one of the cars can simultaneuosly actuate all the gripping devices in the train or simultaneously release all the gripping devices and apply the brakes.

Figure 4:
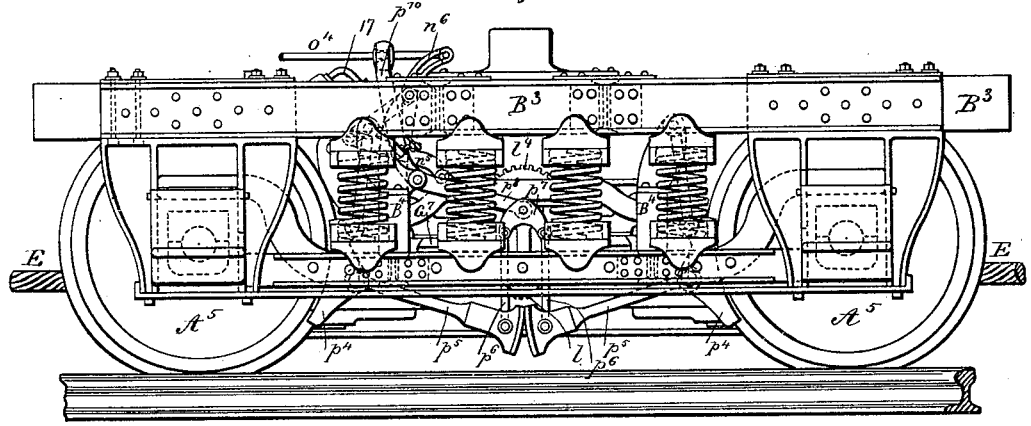
Figure 5:
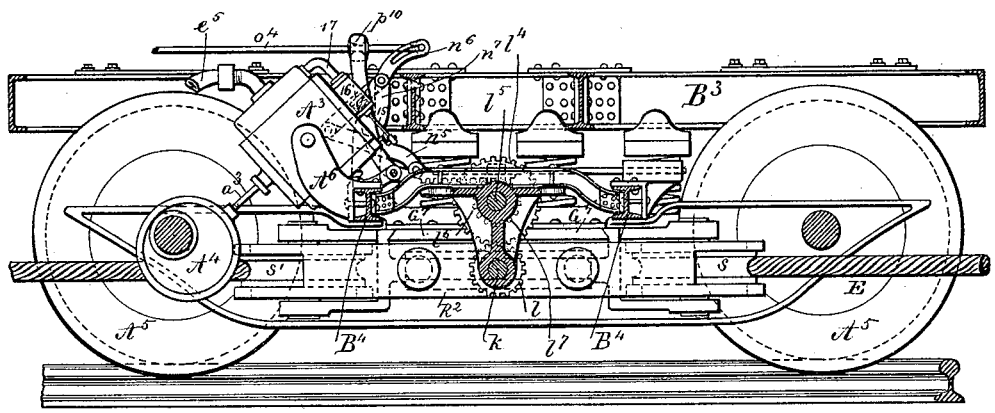

In the drawings, Figure 1 is a diagrammatic plan of the pipes and connections beneath the center and one end of the car, the platform of the car being indicated by dotted lines. Fig. 2 is a section of the air-pumping cylinder. Fig. 3 is a detached view of the levers and connections to the grip and brake, respectively. Fig. 4 is an elevation of the truck. Fig. 5 is a vertical section at the line $x\,x$ of Fig. 6. Fig. 6 is a plan view of the truck. Fig. 7 is a partial section near the middle of the truck at the line $y$; and Fig. 8 is a plan view of the frame for the grip and wheels.

Let $A^3$ represent a cylinder in which is a piston actuated by a rod, $a^3$, to an eccentric, $A^4$, upon the axle of one of the car-wheels, $A^5$. The truck-frame $B^3$ is preferably made of iron bars, and upon one of the cross-bars, $B^4$, of this frame is a bracket, $A^6$, to receive the trunnions of the cylinder $A^3$, so that said cylinder may oscillate as the piston and rod are actuated by the eccentric $A^4$. This pump $A^3$ is for compressing air. It may be of any desired size or construction, with inlet-valves 10 and outlet-valves 11, and there is a pipe, $e^3$, connected to the pump by a flexible tube, $e^5$, and passing to the reservoir $E^3$, for containing air under pressure, and there is an inlet-opening at 14, provided with a cock or damper by which the supply of air to the pump can be regulated, and there is a spring-gage at 16, with a piston and rod or connection, 15, to the cock or damper at the opening 14, and a pipe, 17, leading from the gage 16 to the air-chamber, through which the compressed air passes by the flexible branch pipe $e^5$ to the pipe $e^3$, that leads to the reservoir $E^3$, so that when the pressure in the air chamber and vessel $E^3$ exceeds the maximum amount the spring-gage 16 will, by the link-piece, partially close the air-inlet 14 and prevent a portion or the whole of the air passing into the pump, thus regulating the amount of air pumped, according to the amount of air and pressure required in the reservoir $E^3$.

It is to be understood that we do not limit ourselves to any peculiar construction of the air-pumping cylinder, so long as the said pump is adapted to forcing the air and to stopping automatically when the maximum pressure has been exceeded.

$F^3$ is a cylinder containing a piston-rod and spring, similar to the cylinders and pistons made use of in the ordinary air-brakes for a car, and $G^3$ is a similar cylinder, piston-rod, and spring, the duty of the cylinder $G^3$ and its connections being to release the grip upon the cable E and to apply the brake to the wheels $A^5$, and the duty of the cylinder $F^3$ and its connected parts being to take off the brake from the wheels $A^5$ and to apply the grip to the cable E. The grip and brake and connections will be hereinafter described.

We will next set forth the manner in which the compressed air in the reservoir $E^3$ is made to act in either cylinder $F^3$ or $G^3$. Along beneath each car are two pipes, $f^3$ $g^3$, and these are to be coupled together at the ends of the cars by any suitable coupling, as indicated at 20 and 21. These couplings are similar to those used on air-brakes in cars, and at the ends of the train the pipes $f^3$ $g^3$ are closed by any ordinary cock or other appliance, as usual with air-brakes. In each car, between the pipe $e^3$ and the pipe $g^3$, there is a branch pipe with a cock, 23, and between the pipe $f^3$ and the pipe $e^3$ is a branch and cock, 24. Between the reservoir $E^3$ and the cylinder $F^3$ is a branch pipe and cock, 26, and between the reservoir $E^3$ and the cylinder $G^3$ is a branch pipe and cock, 25. A small cylinder, 27, containing a piston-rod and spring similar to the gage 16, Fig. 2, is applied between the pipe $g^3$ and the cock 25, and a similar cylinder, 28, with a piston, rod, spring, and connection is applied between the air-pipe $f^3$ and the cock 26. It is now to be understood that when the brakeman or attendant opens the cock 23 on any one of the cars by means of a handle or lever extending up through the platform or otherwise, the compressed air from the reservoir $E^3$ passes through the pipe $e^3$ and cock 23 into the air-pipe $g^3$ and raises the pressure of air therein throughout the entire train and actuates all the cocks 25 by the cylinders 27 and their connections, and causes the compressed air from each of the respective reservoirs $E^3$ to pass into each of the cylinders $G^3$, and relieve the grip upon the cable E and apply the brakes to the wheels. On the other hand, if the attendant opens the cock 24 on either car, the compressed air passes through the pipe $e^3$ into the pipe $f^3$, raising the pressure in that pipe throughout the entire train, and by means of the pistons in the cylinders 28 and their connections the cocks 26 are opened, and the air under pressure from each reservoir $E^3$ passes into the cylinders $F^3$, to relieve the brakes from the wheels and to apply the grip to the cable E.

From the foregoing it will be apparent that one attendant on either car can, by operating the cocks 23 24 upon either of the cars, apply the grip to the cable upon all the cars of the train, or release that grip and apply the brakes to stop the train, and, furthermore, where separate cars are used upon a cable road, they can be operated separately, as before described, and where one car is used for drawing or stopping the train, that car is fully operated for the given purpose, when constructed as before described.

In order to illustrate more fully the manner of applying the aforesaid improvement, we will describe a manner in which the brakes and the grip can be arranged so as to operate in the manner before described; but we remark that any suitable brake may be made use of, and that the device for gripping the cable corresponds generally with that shown in our application No. 173,678, filed simultaneously with this application, to which a reference is hereby made. In the present case, however, we have applied the gripping device with a truck-frame and wheels for a car.

$r$ $r'$ $s$ $s'$ represent the guide-wheels for the cable E, the wheels $r$ $r'$ having journals that are in boxes $r^2$ $r^3$, and there are springs $r^4$ $r^5$, that press the journals toward the cable, the wheels $s$ $s'$ having similar journal boxes and springs. The plate or frame $G^1$ has a gripping-piece at one side of the cable, and there is a second gripping piece or jaw at the opposite side of the cable.

R $R^2$ are the brake-bars that act upon the respective pairs of wheels $r$ $r'$ $s$ $s'$, and $k$, Fig. 5, is the screw by which the respective parts of the gripping mechanism are actuated, all of which will more fully appear by reference to the aforesaid application.

$l$ is a wheel upon the end of the screw $k$, by means of which the same is revolved in one direction to apply the grip and in the other direction to release the grip, and we combine therewith a gear, $l^4$, upon a shaft, $l^5$, that is supported in bearings $l^6$ upon the truck-frame, and there is a pinion, $l^7$, upon the shaft $l^5$, against which the rack-bar $n^4$ is made to act to turn the said pinion and screw $k$ in either direction. This rack $n^4$ is supported in suitable guides upon the truck-frame, and as a convenient means for giving motion to the same we make use of the lever $n^6$, pivoted in the jaws $n^7$ upon the cross-bar $B^4$ of the truck-frame, and there is a link, $n^5$, between the lever $n^6$ and the rack $n^4$, and to this lever $n^6$ is connected the rod $o^4$, that leads to the equalizer $o^5$, rod $o^6$, and lever $o^7$, that is pivoted to the piston-rod $o^8$ of the cylinder $F^3$; hence, when the piston in this cylinder $F^3$ is moved by the air-pressure, as aforesaid, the lever $o^7$, rods $o^8$ $o^6$ $o^4$ move the lever $n^6$, link $n^5$, and rack-bar $n^4$, and apply pressure to the grip by rotating the screw $k$. There is a second lever, $o^9$, connected to the lever $o^7$ by the link $o^{10}$, in order that a second rod, $o^6$, (see Fig. 1,) may be led off to the second truck and frame of the car, to act therein upon a gripping device for the cable, as before described; but this may be dispensed with where the gripping device is applied to only one truck upon the car.

The brakes are most clearly shown in Fig. 3, wherein $p^4$ represents the brake-shoes $p^5$ the eccentric or toggle bars, and $p^6$ the links to the head-piece $p^7$, that is suspended from the arm $p^8$ at one end of the shaft $p^9$, that is supported by bearings upon the cross-bar $B^4$ of the truck-frame, and near the inner end of the shaft $p^9$ is an arm, $p^{10}$, that extends up and is bent inwardly and terminates as an eye, through which the rod $o^4$ passes, and there is a rod, $q^4$, passing from the equalizer to the lever $q^5$, one end of which is pivoted to the piston-rod $q^6$ of the air-cylinder $G^3$, and $q^7$ becomes the fulcrum for the lever $q^5$, so that when the air is admitted into the cylinder $G^3$ and moves the piston and rod thereof the rod $q^4$ is drawn upon, and through the equalizer $o^5$ and rod $o^4$ the lever $n^6$ is drawn back, moving the rack-bar $n^4$, rotating the screw $k$ and releasing the grip, and by the further movement the lever $n^6$, coming against the eye of the lever $p^{10}$, moves the same, and by the arm $p^8$, head-piece $p^7$, and links $p^6$, raises the toggle or eccentric bars $p^5$ and applies the brakes $p^4$ to the wheels $A^5$. When the contrary motion is given, as before described, by pushing the rods $o^6$ and $o^4$ endwise, the pressure on the brakes is released and they are disconnected by gravity, and the further movement given to the bar $n^4$ rotates the screw $k$ and applies the grip. The slot in the lever $n^6$ and in the rod $q^4$ permits the parts to be moved to release the screw and the grip upon the cable before applying the brakes and to release the brakes before applying the grip.

It is to be understood that if the brakes are applied to all four truck-wheels, the brake apparatus before described will be duplicated, and there will be a second bar, $o^4$, from the other end of the equalizer $o^5$, as seen in Fig. 1, and the two sets of brakes will be operated simultaneously and uniformly. It is not necessary, however, to duplicate the link $n^5$ and rack-bar $n^6$, as only one rack bar is required upon the truck. It will be further apparent that when the brakes are applied to each truck the levers $q^5$ $q^8$ should be connected by the link $q^7$, and the bar $q^4$ and parts connected therewith duplicated, so as to act upon the brakes of each truck in the same manner.

We claim as our invention—

1. The combination, with a car-brake and a mechanism for gripping or releasing a traction-cable, of an air-reservoir, an air-cylinder, its piston, rod, and connections, substantially as specified, for releasing the grip and applying the brake to the wheels, and a second air-cylinder, its piston, rod, and connections for releasing the brake and applying the grip to the cable, substantially as specified.

2. The combination, with a traction cable and grip, of a car truck and wheels, an air-pump receiving its motion from the wheels, a reservoir into which the air is pumped, a cylinder, rod, and connections for actuating the gripping device, substantially as set forth.

3. The combination, with the car-truck, traction-cable, and gripping device, of an air-pump actuated by a connection to the car-wheels, a reservoir into which the air is pumped, a cylinder, and devices for actuating the grip for the cable by the air-pressure, and an automatic gage for stopping the pumping of the air when the maximum pressure is attained, substantially as set forth.

4. The combination, with the traction-cable and its gripping device, of a reservoir containing air under pressure, cylinders and pistons, rods, and connections for applying the grip and removing the brake and removing the grip and applying the brake, and cocks or valves, and air cylinders and pistons for actuating the same, and air pipes and cocks, substantially as specified, whereby the grip and the brake respectively are controlled whether in one or several cars, substantially as set forth.

5. The combination, with the traction-cable, grip for the same, and the cars and car-brakes, of two air-pipes extending the length of two or more cars, the coupling for connecting said pipes, a reservoir for containing compressed air, and cocks by means of which the compressed air is directed to the brake mechanism or to the grip mechanism at will, substantially as set forth.

6. The combination, with the grip mechanism and traction-cable, of the truck frame and wheels, the brake mechanism, and the lever, rack, and connections, substantially as specified, for releasing the grip and then applying the brake, and releasing the brake and then applying the grip, substantially as set forth.

7. The combination, with the car wheels and brake and the grip mechanism for connecting the car to a traction-rope, of an air-reservoir, and mechanism actuated by the compressed air for applying the grip in grasping the traveling rope, and mechanism actuated by the compressed air for applying the brake when the grip is released, substantially as specified.

8. The combination, with grip mechanism for connecting the car to a traction-rope, of an air pump and reservoir, a connection to the axle of the car-wheels to drive the pump, and mechanism actuated by the compressed air for applying the grip in grasping the traveling rope, substantially as set forth.

9. The combination, with the car and wheels, of an air-pump receiving its motion from the wheels, a traction cable and grip, and mechanism for actuating the grip by the compressed air, substantially as specified.

Signed by us this 3d day of August, A. D. 1885.

J. H. PENDLETON.
CORNELIUS TIERS.

Witnesses:
 GEO. T. PINCKNEY,
 WILLIAM G. MOTT.